Figure 3:
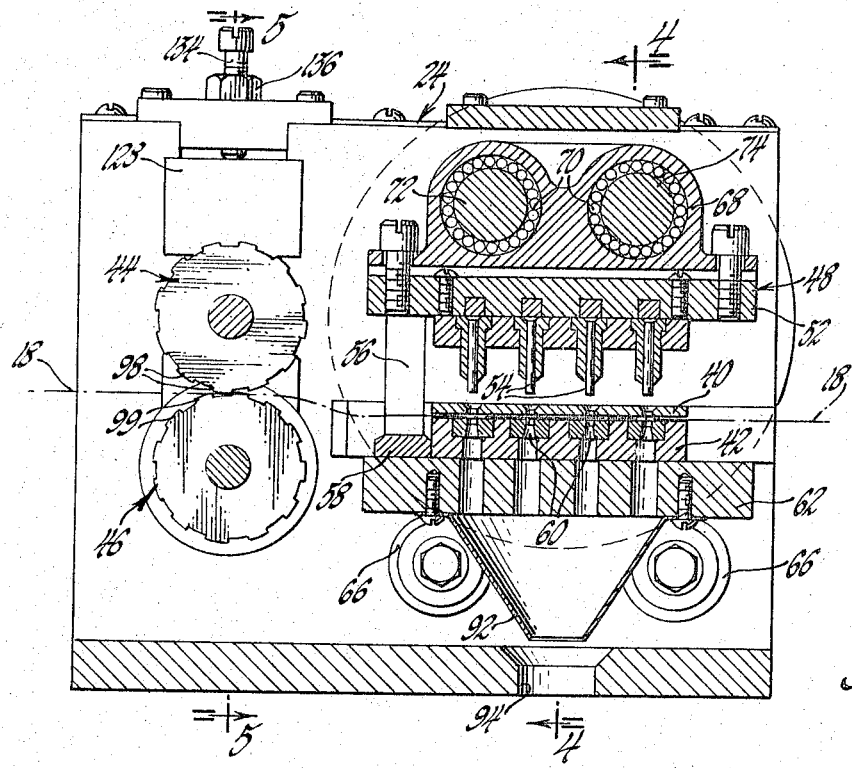

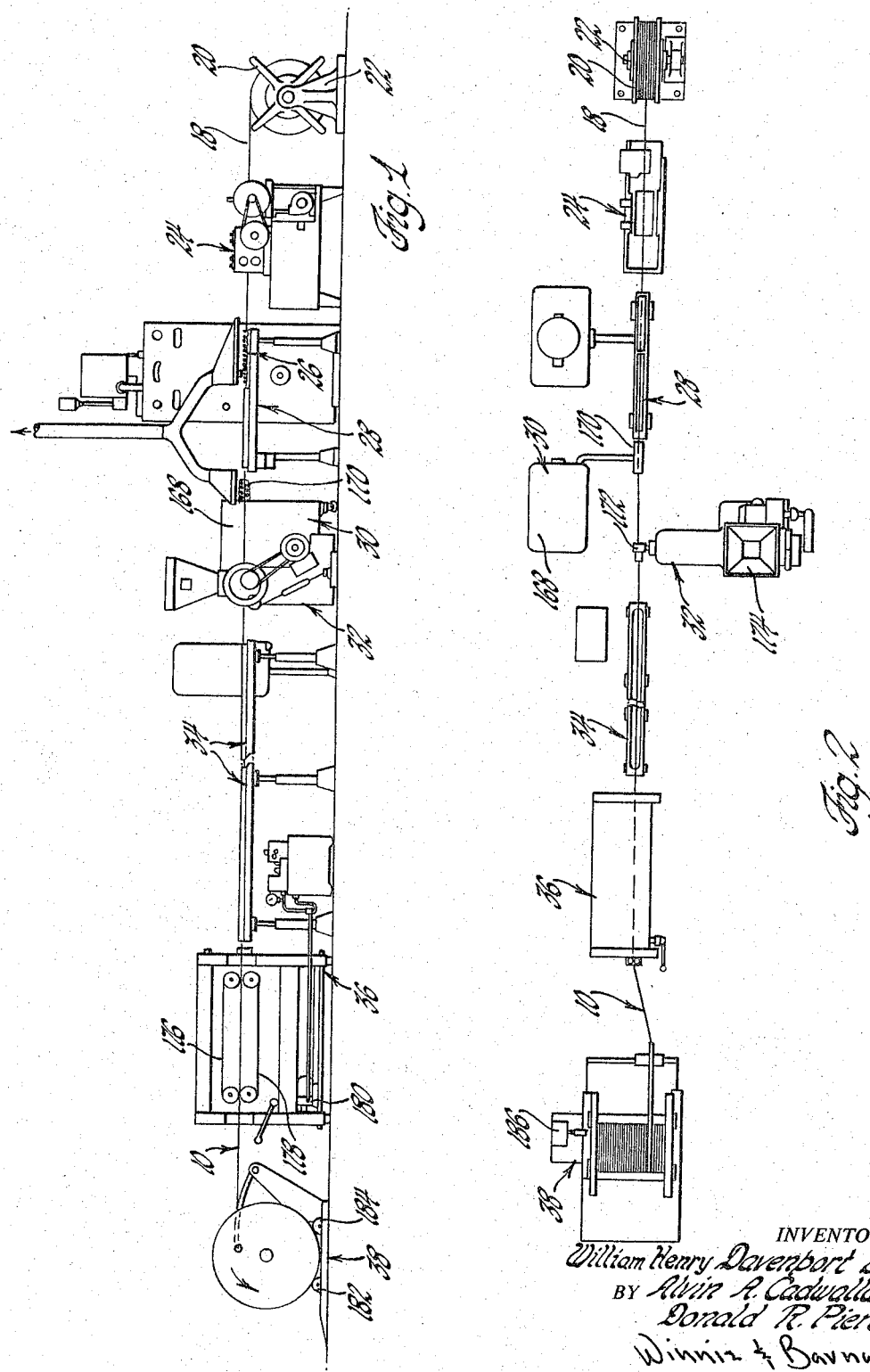

INVENTORS
William Henry Davenport Brouse
Alvin A. Cadwallader, &
Donald R. Pierce
BY
ATTORNEYS INVENTORS
William Henry Davenport Brouse
Alan R. Cadwallader, &
Donald R. Pierce
BY Winnie & Barnard
ATTORNEYS United States Patent Office 3,317,993
Patented May 9, 1967

3,317,993
APPARATUS AND METHOD FOR MAKING
FLEXIBLE CONDUITS
William Henry Davenport Brouse, Toronto, Ontario, Canada, and Alvin A. Cadwallader, Hatboro, and Donald R. Pierce, Upper Dublin Township, Montgomery County, Pa., assignors to Teleflex Incorporated, North Wales, Pa., a corporation of Delaware
Filed Dec. 4, 1961, Ser. No. 156,856
17 Claims. (Cl. 29—527)

The present invention relates to an apparatus and method for continuously forming flexible conduits. More particularly, the present invention is directed to the formation of flexible conduit of the type shown in copending application Ser. No. 66,973 Cadwallader filed Nov. 3, 1960, now Patent No. 3,126,757.

The type of flexible conduit formed by the subject apparatus includes a generally flat flexible base member formed of suitable strip stock which is punched and formed to provide longitudinally spaced and oppositely offset bridge or strap portions forming an interrupted tunnel longitudinally of the base member. A control member is movably, either slidably or rotatably, supported within said tunnel. The respective ends of the control member are normally suitably connected to operatively interconnect remotely located devices for coordinated actuation. In addition, the subject apparatus is adapted to uniquely form a plastic coating about said strip base member, prior to insertion of the control member, to provide a protective coating for said member as well as for the movable control member.

In general, the method of forming the subject flexible conduit includes feeding strip stock from a storage reel through a punching and forming device in which a plurality of longitudinally equally spaced holes are punched, alternately offsetting the strip material between the holes to form bridge or strap members disposed on opposite sides of said strip, heat treating the formed strip to harden the same, followed by quenching, after which the strip is tempered, thereafter forming a plastic casing about said formed strip and, finally, winding the formed and coated conduit on a storage reel.

One of the more unique aspects of the present invention is the method whereby a rapidly moving strip may be continuously punched and formed to provide an interrupted tunnel construction. This unique method is achieved through a device which includes a reciprocal punch-die device coacting with forming rolls to move the strip therethrough in a precisely timed sequence such that holes are punched through the strip and the material between the holes alternately offset in opposite directions to provide the bridges or straps which retain the movable control member therebetween.

Another unique aspect of the present invention is the apparatus for sequentially heat treating the rapidly moving strip after it has been punched and formed in order to harden, quench, temper and cool the strip prior to its being coated with a protective casing.

The subject apparatus also uniquely extrudes a plastic casing about the formed strip such that the casing is drawn down about the strip bridges or straps in a manner such that the movable control member ultimately retained within the strip is actually supported on the relatively low friction surface of the casing and thereby essentially avoiding metal-to-metal frictional contact.

The details, as well as other objects and advantages of the present invention, will be apparent from a perusal of the detailed description which follows.

Figure 6:
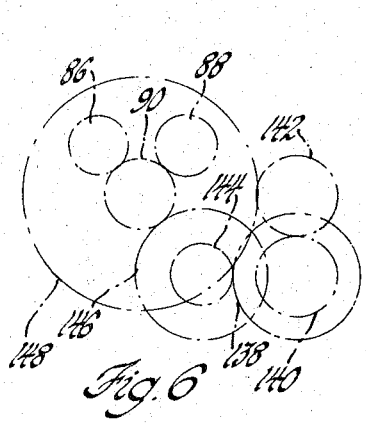
Figure 4:
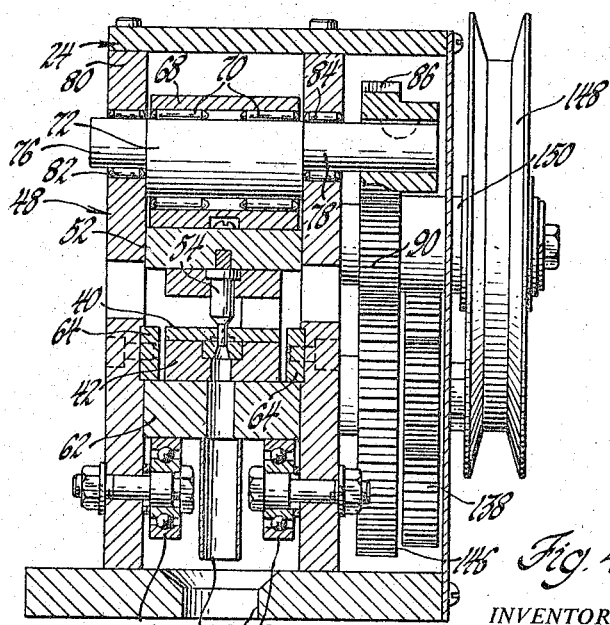
Figures 5, 7:
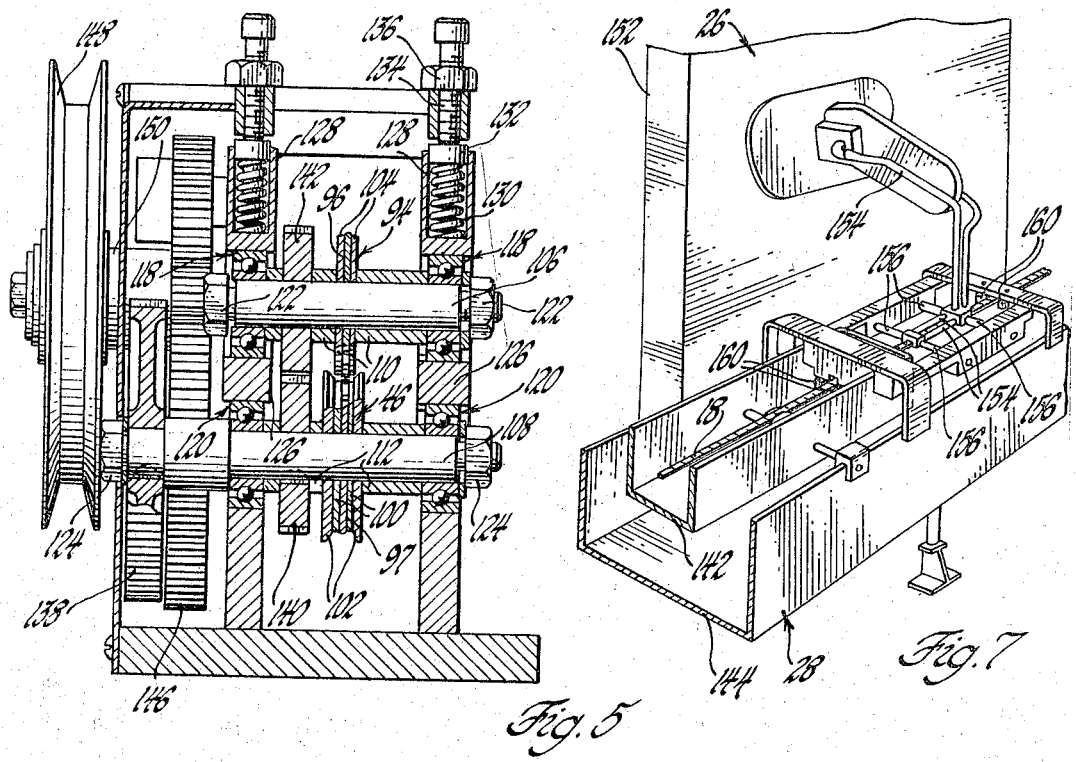
Figure 8:
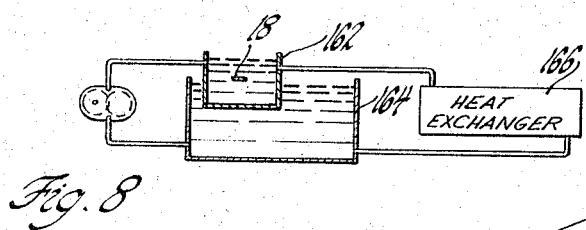
Figure 9:
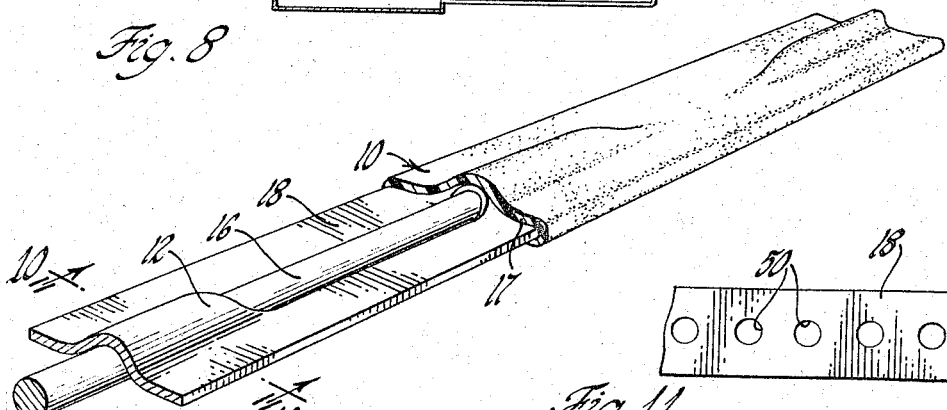
Figure 11:
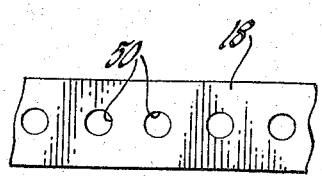
Figure 10:
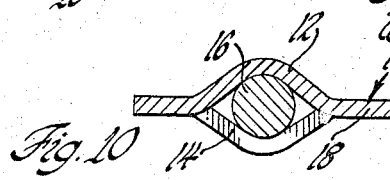

In the drawings:
FIGURES 1 and 2 are elevational and plan views, respectively, of the conduit forming and storing apparatus;
FIGURE 3 is a longitudinal sectional view showing the strip punching and forming device;
FIGURE 4 is a view along line 4—4 of FIGURE 3;
FIGURE 5 is a view along line 5—5 of FIGURE 4;
FIGURE 6 is a diagrammatic view of the gear train of the punching and forming device;
FIGURE 7 is a perspective view of the strip heat treating station;
FIGURE 8 is a diagrammatic view of the quenching tank;
FIGURES 9 and 10 show the conduit made by the subject invention;
FIGURE 11 shows the base strip after holes have been punched therein.

The present invention is directed to the method and apparatus for making the unique conduit shown in FIGURES 9 through 11. Conduit 10 is the subject matter of copending application Ser. No. 66,973 Cadwallader, filed Nov. 3, 1960, now Patent No. 3,126,757.

Conduit 10 includes a base strip, preferably metal but formable from any suitably resilient material, e.g. plastic. The strip is punched and formed, infra, to provide an intermittent tunnel comprising oppositely offset strap portions 12 and 14. A control member, such as wire 16, is movably, slidably or rotatably confined between straps 12 and 14. A plastic casing 17 is formed about the base strip to protect the members against dirt and corrosion as well as to provide a relatively frictionless supporting surface for control member 16.

The overall apparatus for forming flexible conduit is shown in FIGURES 1 and 2. In a preferred embodiment, steel strip 18 is supplied to the apparatus from a reel 20 which is rotatably supported upon a pedestal 22. Strip 18 is preferably SAE 1050 steel. The strip from reel 20 is fed to the punching and forming device indicated generally at 24. As will subsequently be considered in greater detail, device 24 actually pulls strip 18 from reel 20 in the process of punching and forming. Next, the punched and formed strip is led to an R.F. generator and coil device 26 where the strip is hardened. From hardening device 26, strip 18 is led to an oil quench trough 28 after which the strip passes through a second coil-generator device 30 where the strip is heated to its tempering temperature.

The tempered strip now passes to a plastic extruder device 32 in which casing 17 is formed about base strip 18. The plastic coated strip next passes through an elongated water trough 34 which cools and causes the plastic coating to set. A tensioning or caterpillar type device 36 is provided beyond water cooling trough 34 to maintain the strip under tension after it leaves punching and forming device 24. From tensioning device 36 the plastic coated strip is wound on a power driven reel 38 for storage and ultimate shipping.

The individual devices comprising the overall flexible conduit forming apparatus will now be considered in greater detail.

Punching and forming device

The details of punching and forming device 24 are shown in FIGURES 3 through 5 to which the following description most particularly relates. As best seen in FIGURE 3, strip 18 enters device 24 from the right. The path of the strip is between a stripper plate 40 and a die plate 42 from which it passes to forming rolls 44 and 46.

Forming rolls 44 and 46 provide the force which pulls strip 18 from reel 20 into device 24. It is important to note that the path of strip 18 between stripper and die plates 40 and 42 is below the path of the strip as it passes between form rolls 44 and 46. This differential in strip path elevation is intentional to provide a slight buckle in the strip in order to condition the same for further buckling which occurs periodically as the strip is being punched. Without this means for providing controlled buckling of strip 18, as would occur if the path of movement from the stripper plate was at the same elevation as the path through the forming rolls, the strip would tend to resist buckling in such a way as to cause erratic rates of movement of the strip through device 24. Particularly as regards its movement through punching and forming device 24, it is imperative that the movement of the strip be extremely accurately controlled in order that the punching and forming operations occur in a predetermined sequence in order to provide the oppositely offset bridges or straps 12 and 14 in base strip 18.

As will be better understood from the subsequent description, the punch and die assembly 48 of device 24 moves longitudinally with strip 18 during tthe punching of holes 50 therein and such longitudinal movement of the punch must be at a greater speed than that of the normal strip speed in order that the punch may be withdrawn and returned to a position in which the next set of holes are to be punched. This difference in rate of movement between the punch and die assembly and the strip therefore accounts for the inevitable buckling that occurs as the strip passes between punch device 48 and form rolls 44 and 46.

Punch and die assembly 48 includes a punch plate 52 containing four punches 54 secured thereto. Two posts 56 are fixed to punch plate 52. Posts 56 are guided in bushings 58 of die plate 42. Thus punches 54 can move vertically into dies 60 while the whole assembly 48 moves in the direction of strip movement.

Base 62 of die plate 42 is guided between strips 64 and bearings 66 which permit the die plate assembly to move in the direction of strip travel while at the same time restraining the dies from any vertical motion. Punch plate 52 is attached to a frame 68 which is, in turn, reciprocably mounted through needle bearings 70 on eccentric shafts 72 and 74.

Eccentric shafts 72 and 74 include concentric portions 76 and 78 which are rotatably supported within supporting structure 80 through bearings 82 and 84. The eccentric or crank portions 72 and 74 are adapted to oscillate from 68 to impart vertical movement to punch plate 52 and longitudinal, to and fro, unison movement to punch and die plates 52 and 42.

Eccentric shafts 72 and 74 are rotatably driven by identical gears 86 and 88 each of which meshes with a common driving gear 90. Rotation of the eccentric shafts moves frame 68 and hence punches 54 relative to dies 60 in a direction perpendicular to strip 18 and, at the same time, the horizontal component of the eccentric-induced movement moves the punch and die assembly 48 as a unit in a reciprocating fashion parallel to the direction of strip travel. The horizontal movement of the assembly being in the same direction as strip travel when the punches are moving downwardly and in the opposite direction to strip travel when the punches are moving upwardly.

Being trapped between bearings 66 and strips 64, die plate 42 can only be driven by the horizontal component of the eccentric shaft rotation while punch plate 52 is free to follow both the horizontal and vertical components of the eccentric-induced motion.

A funnel-like member 92 is attached to the underside of die plate 62 to collect and guide slugs punched from strip 18 out of the machine through a hole 94 in the base thereof.

In the preferred form of the invention, punch plate 52 includes the four punches 54 spaced ¾ of an inch apart. The gearing which actuates eccentric shafts 72 and 74 is arranged to drive the punches through the strip one time for each inch of strip travel. The pitch diameter of the forming rolls 44 and 46 and the rotational speed thereof are such that one inch of strip is pulled through the punch and die assembly for each cycle of the punches. Thus, each inch of strip contains four holes spaced one quarter (¼) of an inch apart.

As best seen in FIGURES 3 and 5, form rolls 44 and 46 consist of a middle disc 96 and 97 with forming elements or protrusions 98 and 99 on the outer periphery and retained between two sets of discs 100 and 102 in the case of the lower form roll and between two plain discs 104 in the case of the upper form roll. The tapered flanges on the outer set of discs 102 on the lower roll 46 transversely trap strip 18 to prevent strip movement at right angles to its direction of travel.

Form rolls 44 and 46 are driven by shafts 106 and 108. The form rolls are held to their respective shafts by frictional engagement with sleeves 110–112 exerting pressure between the rolls and the inner races of the shaft mounting bearings 118 and 120 when the nuts 122 and 124 are tightened.

Shafts 106 and 108 are mounted in bearings 118 and 120 with the outer races of the bearings 120 seated in frame 80. Bearings 118 are separated from the bearings 120 by spacers 126. Bearings 118 are held down against spacers 126 by blocks 128 which in turn are biased by springs 130 which seat against axially adjustable piston members 132. Piston members 132 are adjusted through bolts 134 and lock nuts 136 to adjust the tension of the springs. By this arrangement, the upper shaft 106 can be moved away from lower shaft 108 against the force of spring 130 if an obstruction enters between form rolls 44 and 46. In this manner, the mechanism is protected against damage.

Shaft 108 is driven by a gear 138 and in turn drives shaft 106 by means of gears 140 and 142 which are keyed respectively to shafts 108 and 106. Gear 138 meshes with gear 144 having a common shaft with gear 146. Gear 146 in turn is driven by gear 90 which also drives the eccentric shaft driving gears 86 and 88 of punch assembly 48. Thus, form rolls 44 and 46 are driven through a speed reduction by the game gear that powers punch assembly 48. Power input to the punch and forming assembly 48 is by a belt to a pulley 148 which drives gear 90 through a shaft 150.

The power train may be summarized as follows:

Pulley 148 drives gear 90.
Gear 90 drives two gears 86 and 88 attached to eccentric shafts 72 and 74.
Gear 90 also drives gear 146.
Gear 146 drives gear 144 through a common shaft.
Gear 144 drives gear 138 which through shaft 108 drives gear 140.
Gear 140 drives gear 142 on shaft 106.

Hardening station

As already noted, strip 18 as supplied on reel 20 is heat treated and in a relatively softened state. Accordingly, after the strip has been punched and formed by device 24 it is necessary that it be hardened to provide the requisite resilience for its use as a flexible conduit. To this end, the strip from punching and forming device 24 is fed to heat treating device 26. Device 26 includes a generator 152, rated at approximately 7.5 kw. and 450 kc., as well as an induction element 154. Strip 18 is adapted to pass between portions of element 154 and to be inductively heated thereby.

Due to the relatively small size of strip 18 coupled with the speed at which it is traveling, it is necessary to couple the induction element very closely to the strip in order to heat the strip beyond the critical point of SAE 1050 steel, e.g. 750° F. Accordingly, and as best seen in FIGURE 7, induction element 154 is positioned adjacent strip 18 by four Teflon rods 156 which are, in turn, secured to a frame structure 158 supported upon quenching tank 28. The clearance between the strip and induction heating element 154 is approximately .005 to .010 inch.

Strip 18 is guided through hardening element 154 by two sets of aligned rollers 160 also suitably supported on frame structure 158.

Quenching tank

From hardening device 26, strip 18 is led into an oil bath or tank 28 to quench the heated strip. As best seen in FIGURES 7 and 8, quenching device 28 consists of an upper tank 162 through which strip 18 passes and out of which oil flows into a lower tank 164 which acts as an oil reservoir. A heat exchanger 166 is connected between the upper and lower tanks 162 and 164 so that the oil is cooled as it is pumped back into the upper tank from the lower tank.

Lower tank 164 of the quenching tank is adapted to extend beneath element 154 and thereby provide a support for frame structure 158, which is suitably secured thereto.

Tempering station

Tempering device 30 is disposed adjacent the outlet end of quenching tank 28 and includes a generator 168 and an induction coil 170 through which strip 18 passes to heat the strip to its tempering temperature, e.g. approximately 650° F.

Plastic casing extruder

After leaving the tempering coil 170, steel strip 18 passes through crosshead 172 of a plastic extruder machine 32. Machine 32 includes a hopper 174 which is adapted to be loaded with plastic pellets which are in turn fed through the machine in such a way as to permit the plastic to be extruded from crosshead 172 in a semi-molten state. The plastic is extruded from crosshead 172 in a tubular form about strip 18 and is pinched onto the strip to start the jacketing operation.

Once the plastic is attached to the strip it is pulled onto the strip from its tubular form while still in the semi-molten state. The plastic jacket material is preferably a linear polyethylene. The rate at which plastic is extruded from machine 32 is regulated such that it will be slightly slower than the rate of travel of strip 18. In this way the plastic casing or tube is drawn tightly around strip 18 and assumes the general configuration or outline of the punched and formed strip as seen in FIGURE 9. In addition, as it sets, the plastic casing shrinks slightly below the level of the bridges or straps 12 and 14 of the strip 18 thereby forming a very low friction supporting surface for the control member 12. By this unique manner of forming a plastic casing about the preformed strip, the movable control element is slidably supported upon a low frictional resistant plastic surface rather than solely upon a metal strip surface.

Water cooling trough

The plastic jacket strip 10 is fed through water trough 34 shown in FIGURES 1 and 2 which sets the plastic. Trough 34 is a double tank arrangement similar to the oil quenching tank 28.

Tensioning device

As already noted, strip 18 is pulled from the supply coil 20 by the roller formers 44 and 46 of the punching and forming device 24. However, device 36 is provided to keep the strip in tension through the heat treating and jacketing devices 26, 30 and 32. Tensioning device 36 includes a plurality of track or belt members 176 and 178 having proximately disposed faces adapted to frictionally engage jacketed strip 10 to pull the same and maintain the strip under tension.

It is preferred to drive tensioning device 36 through an hydraulic motor device 180 which permits the device to stall if the punching and forming device 24 stops and yet will otherwise provide tension at all times.

Power driven coil

The finished product as it leaves tensioning device 36 is lever wound on reel 38. In one form of the invention, reel 38 is rim driven by a pair of power driven rollers 182 and 184 which are in turn suitably driven from an hydraulic motor 186.

It is apparent that various structural modifications may be made in the subjuct apparatus within the intended scope of the invention as set forth in the hereinafter appended claims.

In the claims:
1. The method of continuously forming flexible conduit comprising the steps of continuously punching holes in a flexible metal strip member at relatively closely spaced intervals throughout the length thereof so as to leave solid strip portions intermediate adjacent of said holes, next alternately offsetting adjacent of said solid strip portions to form bridge portions projecting from opposite faces of said strip, heat treating said punched and formed strip to harden the same, quenching the heat treated strip, again heat treating the strip to temper the same, extruding a plastic casing about said punched and formed strip in such a way that said casing assumes the same general configuration as the strip, and cooling said strip to set said plastic.

2. The method of continuously forming flexible conduit comprising the steps of continuously moving a flexible metal strip member in generally horizontal line of movement at a predetermined rate of speed, punching holes in said flexible strip member at relatively close and equally spaced intervals along the length thereof so as to leave solid strip portions intermediate adjacent of said holes, next alternately offsetting adjacent of said solid strip portions to form bridge portions projecting from opposite faces of said strip, heat treating said punched and formed strip to harden and temper the same, extruding a plastic tube about said punched and formed strip and thereby engaging said tube to said strip, extruding said tube at a slightly slower rate of speed than the rate of movement of said strip whereby said tube will be drawn down about and assume the same general configuration as the strip, and cooling said strip to set said plastic.

3. The method of continuously forming flexible conduit comprising the steps of continuously moving a flexible strip member in generally horizontal line of movement at a predetermined rate of speed, punching holes in said flexible strip member at relatively close and equally spaced intervals along the length thereof so as to leave solid strip portions intermediate adjacent of said holes, next alternately offsetting adjacent of said solid strip portions to form bridge portions projecting from opposite faces of said strip, extruding a plastic tube about said punched and formed strip and thereby engaging said tube to said strip, extruding said tube at a slightly slower rate of speed than the rate of movement of said strip whereby said tube will be drawn down about and assume the same general configuration as the strip, and cooling said encased strip to set said plastic.

4. The method of continuously forming flexible conduit comprising the steps of continuously moving a flexible strip member in generally horizontal line of movement at a predetermined rate of speed, punching spaced holes in said strip, forming said strip between said holes to provide longitudinally alternate bridge portions projecting from opposite faces of said strip, extruding a plastic tube about said punched and formed strip, extruding said tube at a slightly slower rate of speed than the rate of movement of said strip whereby said tube will be drawn down about and assume the same general configuration as the strip, and cooling said encased strip to set said plastic.

5. The method of continuously forming flexible conduit comprising the steps of continuously moving a flexible metal strip member in generally horizontal line of movement at a predetermined rate of speed, punching spaced holes in said strip, forming said strip between said holes to provide longitudinally alternate bridge portions projecting from opposite faces of said strip, heat treating said punched and formed strip to harden and temper the same, extruding a plastic tube about said punched and formed strip, extruding said tube at a slightly slower rate of speed than the rate of movement of said strip whereby said tube will be drawn down about and assume the same general configuration as the strip, and cooling said strip to set said plastic.

6. An apparatus for continuously forming flexible conduit from a source of flexible strip stock comprising means for continuously feeding said strip through said apparatus, a device including means for punching spaced holes in said strip and means for forming said strip between said holes to provide longitudinally alternate bridge portions projecting from opposite faces of said strip, and a second device forming a plastic casing about said strip so that said casing etxends within the space adjacent each bridge portion.

7. An apparatus for continuously forming flexible conduit as set forth in claim 6 in which said strip feeding means moves said strip at a rate slightly greater than the rate said second device forms said plastic casing about the strip thereby causing said casing to stretch and closely assume the contour of the punched and formed strip.

8. An apparatus for continuously forming flexible conduit from a source of flexible metal strip stock comprising means for continuously feeding said strip through said apparatus, a device including means for punching spaced holes in said strip, means for forming said strip between said holes to provide longitudinally alternate bridge portions projecting from opposite faces of said strip, means for heat treating and tempering said punched and formed strip, and a second device forming a plastic casing about said strip so that said casing extends within the space adjacent each bridge portion.

9. An apparatus for continuously forming flexible conduit from a source of flexible strip stock comprising means for continuously feeding said strip through said apparatus, a device for punching holes in said strip at relatively closely longitudinally spaced intervals to provide solid strip portions intermediate adjacent of said holes, forming means for engaging said strip to oppositely offset adjacent of said solid strip portions to provide bridge portions projecting from opposite faces of said strip, a machine for extruding a casing about said strip in such a way that said casing closely adheres to the general contour of said strip.

10. An apparatus for continuously forming flexible conduit from a source of flexible metal strip stock comprising means for continuously feeding said strip through said apparatus, a device for punching holes in said strip at relatively closely longitudinally spaced intervals to provide solid strip portions intermediate adjacent of said holes, forming means for engaging said strip to oppositely offset adjacent of said solid strip portions to provide oppositely offset bridge portions on said strip, induction heating means for heat treating and tempering said punched and formed strip, a machine coacting with said heat treated strip to extrude a plastic tube thereabout in such a way that said tube closely adheres to the general contour of said strip, and a cooling device adapted to receive said strip to cause said plastic coating to set.

11. An apparatus for continuously forming flexible conduit as set forth in claim 9 in which said punch device includes a frame structure, punch and die members mounted in said structure, said strip being fed between said members, said punch and die members being operatively connected for coordinated longitudinal movement both in the same direction and in the opposite direction relative to the path of movement of said strip, means for vertically moving said punch member relative to said die member to punch said holes in said strip, said punch and die members being movable in the direction of movement of said strip as said punch member is moved vertically downwardly toward said die to punch said holes, said punch and die member being movable in the opposite direction relative to strip movement after said punch has disengaged said strip.

12. An apparatus for continuously forming flexible conduit as set forth in claim 11 which includes a stripper plate fixed to said die member intermediate the latter and the punch member, said plate being perforated to permit the punch member to coact with said die member to punch holes in said strip, said stripper plate being spaced from said die member to permit said strip to pass between said plate and the latter member.

13. An apparatus for continuously forming flexible conduit as set forth in claim 12 in which the punch member includes a plate, a plurality of punch elements aligned in the direction of strip movement, said die member including a plate, the die member plate and the stripper plate including holes therein corresponding in number to said punch elements and vertically aligned therewith, guide means associated with the die plate, stud means fixed to said punch plate and coacting with said guide means to guide said punch member for vertical movement relative to the die member and to operatively connect said members for said coordinated longitudinal movement.

14. An apparatus for continuously forming flexible conduit as set forth in claim 13 which includes driving means for imparting longitudinal and vertical movement to said punch member, said driving means including a shaft rotatably supported in said frame structure, an eccentric portion formed on the shaft, said eccentric shaft being rotatably connected to said punch plate whereby rotation of said shaft will impart said longitudinal and vertical movement to said punch member.

15. An apparatus for continuously forming flexible conduit as set forth in claim 9 in which said forming means comprises a pair of proximately aligned roll members, a pair of parallel shaft members for drivingly supporting said roll members respectively on opposite sides of said strip, each of said roll members including a plurality of identical forming elements radially extending from the periphery thereof and circumferentially spaced about each of said members, the forming elements of one roll member meshingly coacting with the forming elements of the other member, said strip being adapted to pass between said roll members so that the forming elements on each of said rolls alternately engages said strip intermediate adjacent of the holes formed therethrough to offset said strip to provide said oppositely projecting bridge portions.

16. An apparatus for continuously forming flexible conduit as set forth in claim 15 in which said means for continuously moving said strip through said apparatus includes a device for continuously tensioning said strip downstream of said cooling device in combination with said forming means.

17. An apparatus for continuously forming flexible conduit as set forth in claim 10 in which said heat treating means comprises a first high frequency induction element disposed closely adjacent said punched and formed strip, an oil quenching tank for receiving said strip after passing through said first induction element, and an induction coil surrounding said strip as it leaves said quenching tank to reheat said strip to its tempering temperature.

References Cited by the Examiner
UNITED STATES PATENTS

| | | | |
|---|---|---|---|
| 494,609 | 4/1893 | Watson | 148—12.4 |
| 2,344,575 | 3/1944 | Warren | 29—527 X |
| 2,601,083 | 6/1952 | Brouse. | |
| 2,694,659 | 11/1954 | Norton | 148—154 X |
| 2,736,897 | 2/1956 | Parsons. | |
| 3,015,133 | 1/1962 | Nichols. | |

CHARLIE T. MOON, *Primary Examiner.*

WHITMORE A. WILTZ, *Examiner.*